US006790509B2

United States Patent
Yokoyama et al.

(10) Patent No.: US 6,790,509 B2
(45) Date of Patent: Sep. 14, 2004

(54) SUBSTRATE FOR INFORMATION RECORDING MEDIUM, INFORMATION RECORDING MEDIUM, AND METHOD FOR CONTROLLING SURFACE OF SUBSTRATE FOR INFORMATION RECORDING MEDIUM

(75) Inventors: Tomotaka Yokoyama, Shinjuku-ku (JP); Takemi Miyamoto, Shinjuku-ku (JP); Hiroshi Tomiyasu, Shinjuku-ku (JP); Kouji Takahashi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 23 days.

(21) Appl. No.: 09/969,625

(22) Filed: Oct. 4, 2001

(65) Prior Publication Data

US 2002/0164505 A1 Nov. 7, 2002

Related U.S. Application Data

(60) Provisional application No. 60/241,335, filed on Oct. 19, 2000.

(51) Int. Cl.$^7$ ................................................ G11B 5/66
(52) U.S. Cl. ................................ 428/141; 428/694 SG; 428/900; 427/128; 427/129; 427/130
(58) Field of Search .......................... 428/141, 694 SG, 428/900; 427/128, 129, 130

(56) References Cited

U.S. PATENT DOCUMENTS

| 6,426,155 B1 | * | 7/2002 | Tada et al. |
| 6,454,820 B2 | * | 9/2002 | Hagihara et al. |
| 6,537,648 B1 | * | 3/2003 | Takahashi et al. ........... 428/141 |
| 6,595,028 B1 | * | 7/2003 | Miyamoto et al. ......... 65/30.14 |

* cited by examiner

*Primary Examiner*—Leszek B. Killman
(74) *Attorney, Agent, or Firm*—Oliff & Berridge, PLC

(57) ABSTRACT

A substrate for an information recording medium, wherein the period of microwaviness is 2 μm to 4 mm, and if we let wa be the maximum height of this microwaviness and Rmax be the maximum height measured by atomic force microscope, the main surface of the substrate has a wa of no more than 5 nm and an Rmax of no more than 12 nm, provided that wa is the difference between the highest and lowest points on a measurement curve of all measured points in a measurement area.

33 Claims, 4 Drawing Sheets

95% PV VALUE VS. Rmax VS. TOUCHDOWN HEIGHT (TDH)

THE NUMBERS IN THE GRAPH ARE THE TDH (NM)

SUBSTRATE FOR INFORMATION RECORDING MEDIUM, INFORMATION RECORDING MEDIUM, AND METHOD FOR CONTROLLING SURFACE OF SUBSTRATE FOR INFORMATION RECORDING MEDIUM

This application claims the benefit of Provisional No. 60/241,335 filed Oct. 19, 2000.

BACKGROUND OF THE INVENTION

1. Field of the Invention

The present invention relates to a substrate for an information recording medium used as a recording medium in an information processing device, to an information recording medium that makes use of this substrate, and to a method for controlling the surface of a substrate for an information recording medium.

2. Description of the Related Art

Magnetic disks are known as one type of information recording medium. A magnetic disk is produced by forming a thin film of a magnetic layer or the like on a substrate, and aluminum substrates and glass substrates have been used for this purpose. Recently, however, in response to the need for greater recording density, glass substrates have gradually been edging out aluminum substrates because the former allows for a narrower gap between the magnetic head and the magnetic disk than the latter.

The manufacture of a glass substrate generally involves chemical reinforcement in order to increase the strength of the substrate so that it can withstand the impacts to which it is subjected when installed in a magnetic disk drive. Also being manufactured are crystallized glass substrates whose strength is increased by heat treating and crystallizing the glass substrate surface. Higher recording density is also achieved by polishing the surface of a glass substrate to a high degree of precision so that the flying height of a magnetic head can be kept to a minimum.

The move toward higher recording density is being accomplished not only with glass substrates, but also by making a transition in magnetic heads from thin film heads to magneto-resistive heads (MR heads) and giant (large) magneto-resistive heads (GMR heads).

However, no matter how much the surface roughness (Rmax maximum height) and Ra (center-line mean roughness)) are reduced by precision polishing, the problem was that the flying height of the magnetic head could not be lowered. It was found that a reduction of flying height of magnetic head could not be achieved unless surface roughness and microwaviness of the substrate surface were within a specific range and satisfied a specific relationship.

SUMMARY OF THE INVENTION

The inventors discovered that the roughness and microwaviness of a substrate surface are closely related to glide height (touchdown height), and it is an object of the present invention to provide a substrate for an information recording medium, and the information recording medium itself, with which the desired glide height (touchdown height) can be achieved by setting the roughness and microwaviness of a substrate surface within a specific range and relationship.

The present invention was conceived in light of the above object, and is constituted as follows.

Constitution 1

A substrate for an information recording medium, wherein the period of microwaviness is 2 μm to 4 mm, and if we let wa be the maximum height of this microwaviness and Rmax be the maximum height measured by atomic force microscope, the main surface of the substrate has a wa of no more than 5 nm and an Rmax of no more than 12 nm, provided that wa is the difference between the highest and lowest points on a measurement curve of all measured points in a measurement area.

Constitution 2

A substrate for an information recording medium, wherein the period of microwaviness is 2 μm to 4 mm, and if we let wa be the maximum height of this microwaviness and Rmax be the maximum height measured by atomic force microscope, when wa is expressed by x and Rmax by y, the following are satisfied: $x \leq 5$ nm, $y \leq 12$ nm, $y \geq (10/3)x-10$, $y \leq (10/3)x+2$, provided that wa and Rmax are defined the same as in Constitution 1.

Constitution 3

A substrate for an information recording medium, wherein the period of microwaviness is 2 μm to 4 mm, the product of multiplying the maximum height wa (units: nm) of this microwaviness by the maximum height Rmax (units: nm) measured by atomic force microscope is compared with the result of forming at least a magnetic layer on the main surface of the substrate for an information recording medium and conducting a touchdown height test, and a specific Rmax×wa is set so that the desired touchdown height value will be obtained for the correlation between the product of Rmax and wa and the touchdown height(TDH), provided that wa and Rmas are defined the same as in Constitution 1.

Constitution 4

A substrate for an information recording medium, wherein the period of microwaviness is 2 μm to 4 mm, and if we let wa (units: nm) be the maximum height of this microwaviness and Rmax (units: nm) be the maximum height measured by atomic force microscope, the following is satisfied: $Rmax \times wa \leq 58(nm*nm)$, provided that wa and Rmas are defined the same as in Constitution 1.

Constitution 5

The substrate for an information recording medium according to any of Constitutions 1 to 4, wherein wa is a value obtained by excluding any abnormal protrusion points from the measured points.

Constitution 6

The substrate for an information recording medium according to any of Constitutions 1 to 5, wherein the substrate is a glass substrate.

Constitution 7

The substrate for an information recording medium according to any of Constitutions 1 to 6, wherein the substrate is a substrate for a magnetic disk.

Constitution 8

An information recording medium, wherein at least a recording layer is formed on a glass substrate for an information recording medium according to any of Constitutions 1 to 7.

Constitution 9

The information recording medium according to Constitution 8, wherein the recording layer is a magentic layer.

Constitution 10

A method for controlling the surface of a substrate for an information recording medium, wherein the period of microwaviness measured for the main surface of the substrate for an information recording medium is 2 μm to 4 mm, the correlation is found between the product of the maximum height wa (units: nm) of this microwaviness and the maximum height Rmax (units: nm) measured by atomic force microscope and the touchdown height T of said information recording medium when at least a magnetic layer is formed on the main surface of the substrate for an information recording medium, and the Rmax×wa of the substrate for an information recording medium is determined such that the information recording medium will have the desired touchdown height for the found correlation, provided that wa and Rmas are defined the same as in Constitution 1.

Constitution 11

The method for controlling the surface of a substrate for an information recording medium according to Constitution 10, wherein wa is a value obtained by excluding any abnormal protrusion points from the measured points.

BRIEF DESCRIPTION OF THE DRAWINGD

DESCRIPTION OF THE PREFERRED EMBODIMENTS

Figure 3:
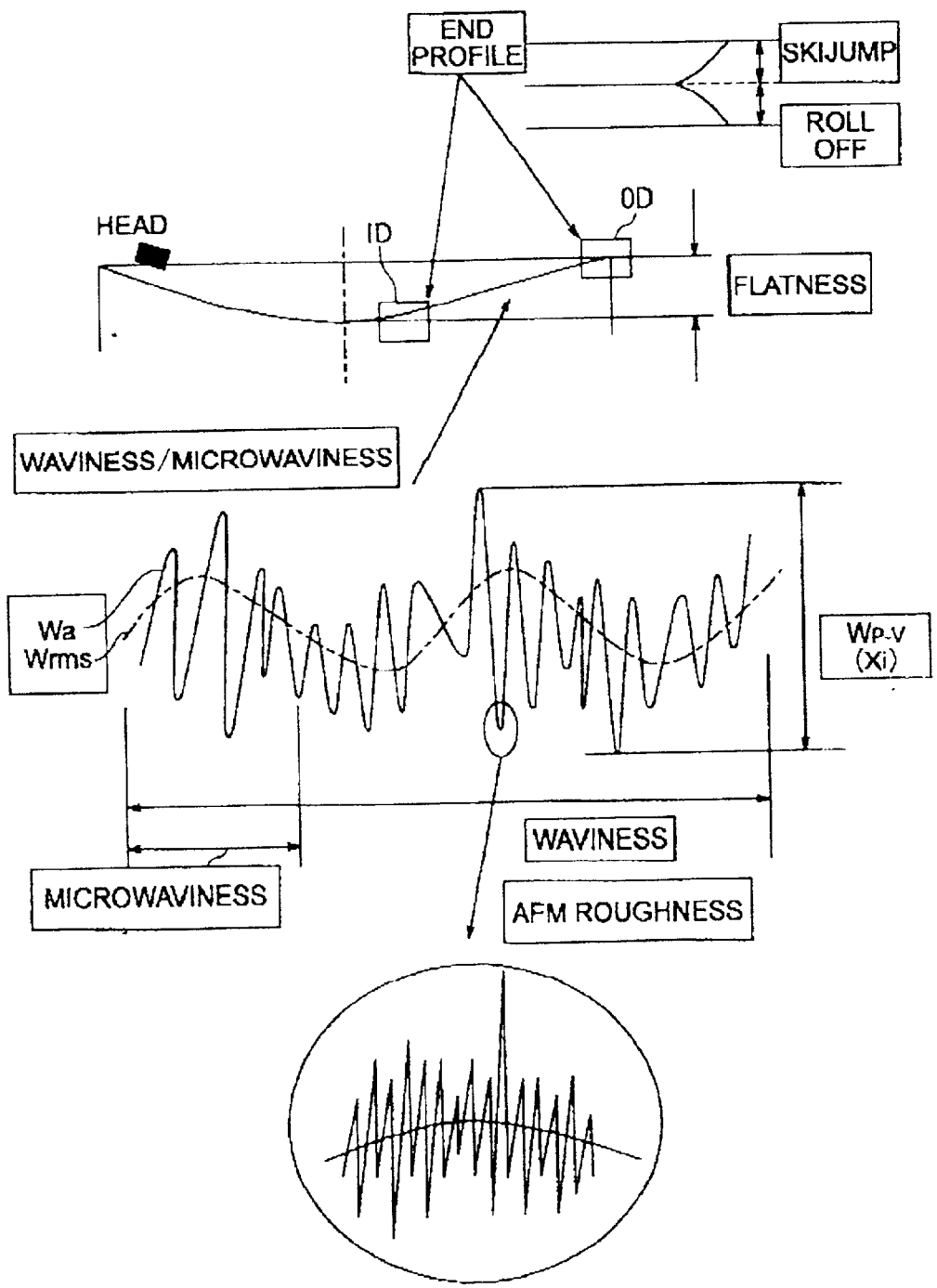
FIG. 3 is a graph illustrating the values of waviness, microwaviness and surface roughness.

The substrate for an information recording medium of the present invention will now be described through reference to the definitions of the various measurement values shown in FIG. 3.

The main surface of the substrate for an information recording medium of the present invention consists of unevenness with a relatively large period and unevenness with a relatively small period. The waviness with a relatively large period can be broken down into waviness and microwaviness according to the period of the waviness. The unevenness with a relatively small period indicates the roughness of the substrate surface. Waviness, microwaviness, and surface roughness can each be measured separately by different measurement methods. The term "period" as used here indicates the distance between the peaks or between the valleys of the unevenness.

"Microwaviness" refers to waviness with a period of about 2 µm to 4 mm, and this microwaviness can be expressed by the average height Ra' and the maximum height wa. The average height Ra' indicates the average of the absolute value of the deviation from the center line to the measurement curve, while wa indicates the difference between the highest point and the lowest point on the measurement curve of all measured points in a measurement area. This microwaviness is measured, for example, with a multifunction surface analyzer (MicroXAM) made by Phase Shift Technology. This measurement is unlike a conventional probe process, and involves scanning a specific area of the substrate surface with light (such as white light), synthesizing the light reflected from the substrate surface with the light reflected from a reference surface, and calculating the microwaviness Ra' and wa from the interference bands produced at the synthesis point.

Figure 4:
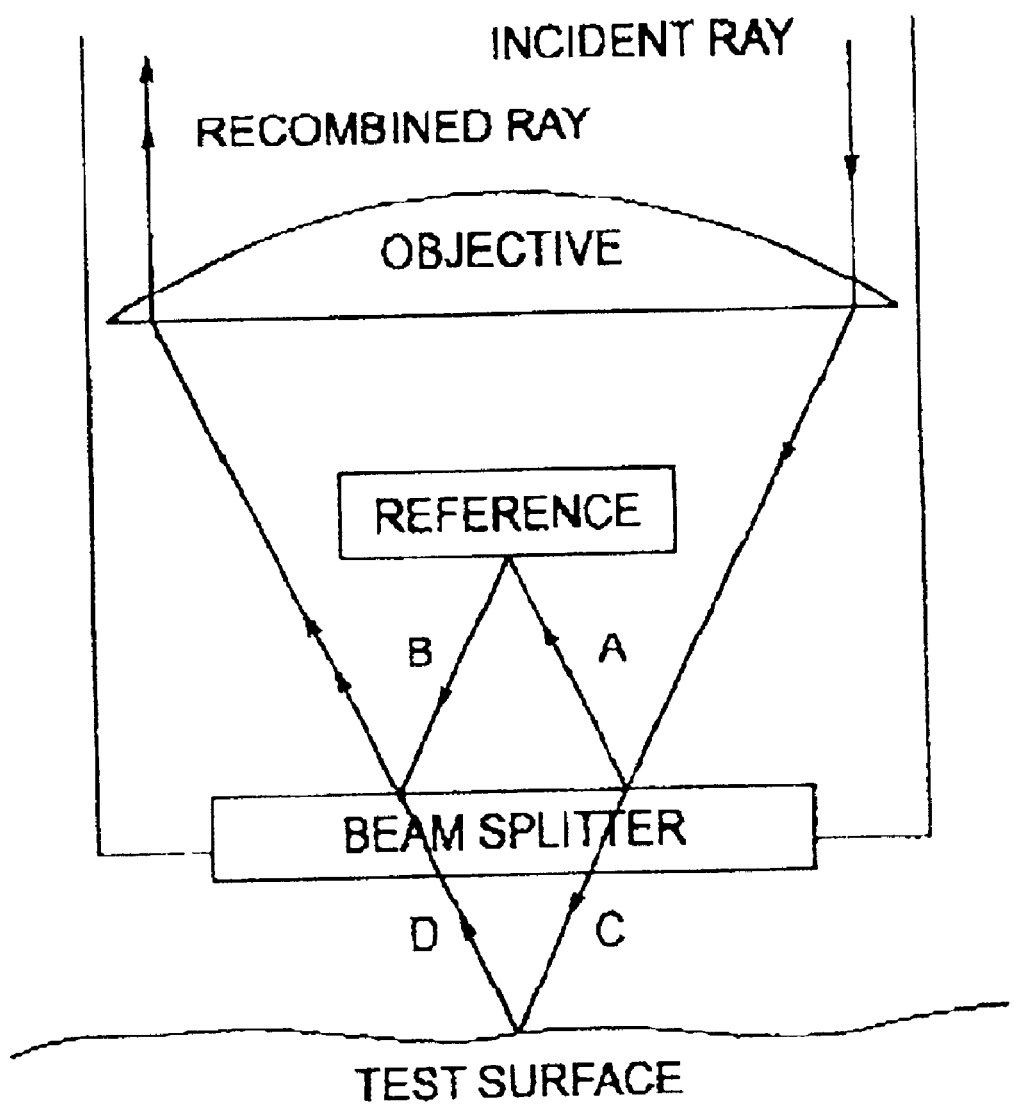
FIG. 4 is a schematic diagram showing an exemplary method of measuring microwaviness.

FIG. 4 is a simple graph of the measurement principle involved here. As shown in FIG. 4, a light wave is split in two and then synthesized according to the principle of an interferometer, and interference bands appear due to the difference between the optical path A→B and the optical path C→D.

With this multifunction surface analyzer (MicroXAM), microwaviness is measured by selecting any area of the substrate (recording and playback area), and preferably the center portion or a suitable rectangular area out of a range of 50 µm$^2$ to 4 mm$^2$ and a specific distance away from the ends. For example, the selected area is less than the surface area of the slider surface of a head slider, and is a rectangular area approximately 500 µm×approximately 600 µm (approximately 250,000 pixels). By thus using as a reference the slider surface of a head slider that participates when a head slider actually moves over a magnetic disk surface, and selecting an area with a smaller surface area than the slider surface, there will be a favorable correlation to the touchdown height. It is particularly good to measure a substrate surface by choosing an area with a microwaviness period of 2 to 650 µm. For example, the surface area of commonly used 30% slider surfaces is 1.25×1.00 mm, in which case 1.25 mm$^2$ or less is preferable. Waviness thus calculated is called microwaviness.

Meanwhile, Rmax is determined by JIS standard (JIS B 0601), and usually there are a number of periods (peak to peak, or valley to valley) within one period of microwaviness. Rmax indicates maximum height, indicating the distance from the tip of the highest peak to the bottom of the lowest valley. This surface roughness is measured by atomic force microscope (AFM).

When microwaviness is defined as above, a touchdown height of 15 nm or less can be achieved if, as in Constitution 1, the period of microwaviness is 2 µm to 4 mm on the main surface of a substrate for an information recording medium, and, if we let wa be the maximum height of the microwaviness, wa is no more than 5 nm and Rmax is no more than 12 nm. The desired touchdown height cannot be achieved unless both of the wa and Rmax parameters indicating the unevenness on the substrate surface are within the ranges given above. To achieve a touchdown height of 8 nm or less, wa must be 4 nm or less and Rmax 8 nm or less, to achieve a touchdown height of 6 nm or less, wa must be 3 nm or less and Rmax 6 nm or less, and to achieve a touchdown height of 4.5 nm or less, wa must be 2.5 nm or less and Rmax 3 nm or less.

From the standpoints of improving magnetic head stability, reducing modulation, and reducing medium noise, it is preferable, as in Constitution 2, if the period of microwaviness is 2 µm to 4 mm and, if we let wa be the maximum height of this microwaviness and Rmax be the maximum height measured by atomic force microscope, when wa is expressed by x and Rmax by y, the following are satisfied: $x \leq 5$ nm, $y \leq 12$ nm, $y \geq (10/3)x-10$, $y \leq (10/3)x+2$. This allows a touchdown height of 15 nm or less to be achieved, and allows modulation and medium noise to be reduced, affording a magnetic recording medium with better recording and playback characteristics. In order to achieve a touchdown height of 8 nm or less while still obtaining the effect of reducing modulation and medium noise, the following must be satisfied: $x \leq 4$ nm, $y \leq 8$ nm, $y \geq (10/3)x-10$, $y \leq (10/3)x+2$; to a achieve a touchdown height of 6 nm or less, the following must be satisfied: $x \leq 3$ nm, $y \leq 6$ nm, $y \geq (10/3)x-10$, $y \leq (10/3)x+2$; and to a achieve a touchdown height of 4.5 nm or less, the following must be satisfied: $x \leq 2.5$ nm, $y \leq 3$ nm, $y \geq (10/3)x-10$, $y \leq (10/3)x+2$.

Numerous experiments were conducted to examine the relationship between touchdown height and the unevenness on a substrate surface, and as a result, it was ascertained with the present invention that touchdown height is correlated to both the maximum height wa of the relatively large unevenness (microwaviness) and the maximum height of the relatively small unevenness measured by atomic force microscope, as discussed above. In particular, as in Constitution 3, it was ascertained by touchdown height is correlated to the product of wa and and Rmax.

As in Constitution 3, it is possible to obtain a substrate for an information recording medium with good touchdown height if the period of microwaviness is 2 μm to 4 mm, the product of multiplying the maximum height wa (units: nm) of this microwaviness by the maximum height Rmax (units: nm) measured by atomic force microscope is compared with the result of forming at least a magnetic layer on the main surface of the substrate for an information recording medium and conducting a touchdown height test, and a specific Rmax×wa is set so that the desired touchdown height value will be obtained for the correlation between the product of Rmax and wa and the touchdown height.

More specifically, as in Constitution 4, a touchdown height of 15 nm or less can be achieved if the period of microwaviness is 2 μm to 4 mm, and, if we let wa (units: nm) be the maximum height of this microwaviness and Rmax (units: nm) be the maximum height measured by atomic force microscope, the following is satisfied: Rmax×wa≦58 (nm*nm). Furthermore, achieving a touchdown height of 10 nm or less requires that wa×Rmax≦33(nm*nm), achieving a touchdown height of 8 nm or less requires that wa×Rmax≦24(nm*nm), achieving a touchdown height of 6 nm or less requires that wa×Rmax≦14(nm*nm), and achieving a touchdown height of 4.5 nm or less requires that wa×Rmax≦7(nm*nm).

The relation between the flying height of testing head and the rotational speed of a magnetic disk can be measured ahead of time with a head flying height tester, and the value of the flying height of testing head can be learned from the rotational speed of the magnetic disk at that time.

The value of flying height of testing head when the unevenness of this magnetic disk first begin to hit the testing head is termed the touchdown height. The touchdown height is approximately equal to the height of the unevenness present on the surface. Because of this, the maximum height wa and Rmax should be selected for both the relatively large unevenness (microwaviness) and relatively small unevenness.

The measured area for maximum height wa of the microwaviness is preferably smaller in surface area than the slider surface of the head slider (magnetic head). If an area is selected whose surface area is larger than that of the head slider, then when the head slider flys over the magnetic disk, it will conform to the head if the period of surface waviness is large, but areas of large waviness period that are unrelated to touchdown height are also included.

There may be particles and other such abnormal protrusions on the substrate surface, so a better correlation to touchdown height will be obtained if, as in Constitution 4, the maximum height wa of microwaviness is obtained by excluding the measurement values for any abnormal protrusions from the measured points.

More specifically, a histogram is plotted of all measurement points, in which the absolute measurement values are plotted on the horizontal axis and the numbers of measurements in which respective absolute measurement values are obtained plotted on the vertical axis, and the numbers of measurements corresponding to the various absolute measured values are accumulated, starting at the absolute measured value showing the greatest distribution and gradually increasing the values from that point. At the point when the accumulated measurement number reaches 95% of the total number, the remaining 5% is considered to be the measured value for abnormal protrusions, which is excluded from the overall measurement points, the difference between the minimum and maximum of the measurement points thus obtained is termed the "95% PV value," this "95% PV value" is used for the maximum height wa, and this maximum height wa can also be expressed as the microwaviness. The average height Ra' of the above-mentioned microwaviness is related to this 95% PV value.

The line on which the abnormal protrusions are excluded can be adjusted as desired. For instance, the above-mentioned 95% may be changed to 98% or 90%.

There are no particular restrictions on the type, size, thickness, etc., of the substrate in the present invention. Examples of the type of substrate include glass, ceramic, silicon, carbon, plastic, polycarbonate, or a metal such as aluminum. Of these, as in Constitution 6, a glass substrate is better than other materials in terms of flatness, smoothness, mechanical strength, cost, and so forth. Examples of glass substrate materials include aluminosilicate glass, soda-lime glass, soda aluminosilicate glass, aluminoborosilicate glass, borosilicate glass, quartz glass, and a glass ceramic such as crystallized glass. In general, in terms of smoothness (lower surface roughness), an amorphous glass containing no crystal phase is preferable to a crystallized glass in which a crystal phase and an amorphous phase are present on the substrate surface. From the standpoints of mechanical strength, impact resistance, vibration resistance, and so on, chemically reinforced glass such as aluminosilicate glass is particularly good. From the standpoint of flatness (less waviness and microwaviness), crystallized glass is better than amorphous glass at a given surface roughness because of the higher Young's modulus and crystal grains of crystallized glass.

Favorable examples of aluminosilicate glass include chemically reinforced glass containing as its main components 58 to 75 wt % $SiO_2$, 5 to 23 wt % $Al_2O_3$, 3 to 10 wt % $Li_2O$, and 4 to 13 wt % $Na_2O$ (chemically reinforced glass A), and chemically reinforced glass containing 5 to 30 mol % $TiO_2$, 1 to 45 mol % CaO, 10 to 45 mol % MgO+CaO, 3 to 30 mol % $Na_2O+Li_2O$, 0 to 15 mol % $Al_2O_3$, and 35 to 60 mol % $SiO_2$ (chemically reinforced glass B). Because it is chemically reinforced, aluminosilicate glass with the above composition has greater transverse bending strength, a very deep compressive stress layer, and excellent Knoop hardness. From the standpoint of ease of control of the microwaviness wa and flatness, and because of the greater Young's modulus, chemical reinforced glass B is preferred.

With the substrate of the present invention, chemical reinforcing may be performed by subjecting the surface of a glass substrate to low temperature ion exchange in an effort to enhance the impact resistance, vibration resistance, and so forth. There are no particular restrictions on the chemical reinforcement method here as long as it is a known method, but as an example, a low temperature chemical reinforcement method in which ion exchange is performed in an area where the transistion temperature is not exceeded is preferable from the standpoint of the glass transistion point. Examples of the alkali molten salt used in this chemical reinforcement include potassium nitrate, sodium nitrate, and a nitrate that is a mixture of these.

In order to increase smoothness, chemically reinforced glass generally undergoes a number of polishing steps to obtain the desired surface roughness, but the waviness or flatness adjusted in the lapping step may suffer as a result of poor lathe precision (conformity), or elasticity in the polishing pad used in the polishing step.

Meanwhile, diamond pellets of relatively fine particle size are used with crystallized glass because the mechanical strength is relatively high, so the product will have a certain amount of flatness and smoothness, and there is therefore less load in the polishing step and it is easier to obtain relatively small microwaviness.

From the standpoint of smoothness, it is preferable for the crystallized glass to have main crystals with a relatively small grain size consisting of enstatite and/or a solid solution thereof. As to the composition thereof, it preferably contains 35 to 65 mol % $SiO_2$, 5 to 25 mol % $Al_2O_3$, 10 to 40 mol % MgO, and 5 to 15 mol % $TiO_2$.

The substrate for an information recording medium of the present invention can be utilized as a disk substrate for electronic engineering, such as a magnetic recording medium substrate, a magneto-optical disk substrate, or an optical disk substrate. The substrate for an information recording medium of the present invention is especially suited to substrates used in magnetic recording media used for recording and playback by means of a magnetic head in which a head slider moves over a medium surface, or in magneto-optical disks for recording and playback by means of a head slider equipped with an optical pickup lens (such as a solid immersion lens). The reason for this is that the waviness and microwaviness of the substrate surface affect the flying height of the head slider.

In particular, as in Constitution 6, the substrate for an information recording medium can be used to advantage in magnetic recording medium substrates, such as a magnetic disk substrate for a magneto-resistive head in which recording and playback are performed with a magneto-resistive type (giant (large) magneto-resistive head).

As in Constitutions 7 and 8, an adverse change in touchdown height can be prevented, and recording and playback at a higher recording density are therefore possible, by using an information recording medium in which at least a recording layer has been formed over the substrate for an information recording medium in the above Constitutions 1 to 6, and particularly an information recording medium in which the recording layer is a magnetic layer. For instance, the information recording medium of the present invention comprises at least a magnetic layer or other recording layer formed over the substrate for an information recording medium of the present invention.

For example, a magnetic recording medium is usually manufactured by successively forming a under layer, a magnetic layer, a protective layer, and a lubricating layer over a magnetic disk substrate that has the required flatness and surface roughness and whose surface has undergone chemical reinforcement as needed.

The under layer in the magnetic recording medium is selected according to the magnetic layer.

Examples of under layers include those composed of at least one type of material selected from among nonmagnetic metals such as Cr, Mo, Ta, Ti, W, V, B, Al, and Ni. Chromium alone or an alloy of chromium is preferable from the standpoint of enhancing the magnetic characteristics, for instance, when the magnetic layer contains cobalt as a main component. The under layer need not consist of a single layer, and may instead have a multilayer structure of a plurality of identical or different layers. Examples include multilayer under layers such as Cr/Cr, Cr/CrMo, Cr/CrV, CrV/CrV, NiAl/Cr, NiAl/CrMo, and NiAl/CrV.

There are no particular restrictions on the material of the magnetic layer in the magnetic recording medium.

The magnetic layer may be, for example, a magnetic film containing cobalt as a main component, such as CoPt, CoCr, CoNi, CoNiCr, CoCrTa, CoPtCr, CoNiPt, CoNiCrPt, CoNiCrTa, CoCrPtTa, CoCrPtB, CoCrPtTaNb, and CoCrPtSiO. The magnetic layer may have a multilayer structure in which a magnetic film is divided by a nonmagnetic film (such as Cr, CrMo, or CrV) to reduce a noise.

The magnetic layer for the magneto-resistive head (MR head) or the giant magneto-resistive head (GMR head) includes those containing impurity elements selected from among Y, Si, rare-earth elements, Hf, Ge, Sn and Zn, or oxides of these impurity elements, in addition to the Co-based alloy.

Further, the magnetic layer may have a granular structure in which magnetic particles of Fe, Co, FeCo, CoNiPt, or the like are dispersed in the nonmagnetic film comprising a ferrite-based material, an iron-rare earth-based material, $SiO_2$, BN, or the like. The magnetic layer may also have a recording format of either in-plane magnetization or perpendicular magnetization.

There are no particular restrictions on the material of the protective layer in the magnetic recording medium.

Examples of the protective layer include a chromium film, a chromium alloy film, a carbon film, a zirconia film, and a silica film. The protective film may be formed continuously along with the under layer and the magnetic layer by the use of an in-line sputtering apparatus. The protective layer may be formed as a single layer or may comprise a multilayer structure composed of the same or different materials.

With the present invention, another protective layer may be used over or instead of the above-mentioned protective layer. For instance, a silicon oxide ($SiO_2$) film may be formed instead of the above-mentioned protective film by dispersing colloidal silica fines in tetraalkoxysilane diluted with an alcohol-based solvent and then coating the chromium film with this dispersion and baking the coating.

There are no particular restrictions on the lubricating layer in the magnetic recording medium.

The lubricating layer is formed, for example, by diluting perfluoropolyether (a liquid lubricant) with a solvent, such as a Freon-based solvent, and using this to coat the medium surface by dipping, spin coating, or spraying, and performing a heat treatment as needed.

Also, as in Constitution 10, the present invention provides a method for controlling the surface of a substrate for an information recording medium for obtaining the desired touchdown height. More specifically, the period of microwaviness measured for the main surface of the substrate for an information recording medium is 2 $\mu$m to 4 mm, the correlation is found between the product of the maximum height wa (units: nm) of this microwaviness and the maximum height Rmax (units: nm) measured by atomic force microscope and the touchdown height T of said information recording medium when at least a magnetic layer is formed on the main surface of the substrate for an information recording medium, and the Rmax×wa of the substrate for an information recording medium is determined such that the information recording medium will have the desired touchdown height for the found correlation. Applying this method for controlling a substrate surface facilitates the design of a substrate surface for obtaining a magnetic recording medium with the desired touchdown height, and allows the touchdown height to be controlled very precisely. Rmax and wa are suitably adjusted by varying the polishing conditions (the polisher, polishing compound, average particle size of the polishing compound, machining pressure, machining time, etc.). Also, as in Constitution 11, the maximum height wa of the microwaviness is a value obtained by excluding any abnormal protrusion points from the measured points, which is preferable in that better correlation with the touchdown height is obtained.

EXAMPLES

Examples 1 to 15 and Comparative Examples 1 to 4

Known machining and film formation technologies may be employed in the manufacture of the magnetic disk glass substrate and the magnetic disk, so these will not be discussed in detail herein.

The chemically reinforced glass substrate and the magnetic disk of the present invention were fabricated by the following procedure.

Raw material processing→rough lapping→beveling (forming, shaping)→mirror polishing of substrate edges→precision lapping→first polishing→second polishing→(third polishing)→washing→chemical reinforcing→washing→magnetic disk manufacture The third polishing step was performed only in the fabrication of the magnetic disk glass substrates of Examples 1 to 4.

The crystallized glass substrate and the magnetic disk of the present invention were fabricated by the following procedure.

Raw material processing→crystallization→beveling (forming, shaping)→mirror polishing of substrate edges→precision lapping→first polishing→second polishing→washing→magnetic disk manufacture Three types of glass were prepared for use in these examples, chemically reinforced glass A, chemically reinforced glass B, and crystallized glass. These types of glass had the following compositions.

Chemically Reinforced Glass A

Aluminosilicate glass containing as its main components 58 to 75 wt % $SiO_2$, 5 to 23 wt % $Al_2O_3$, 3 to 10 wt % $Li_2O$, and 4 to 13 wt % $Na_2O$.

Chemically Reinforced Glass B

Aluminosilicate glass containing 5 to 30 mol % $TiO_2$, 1 to 45 mol % CaO, 10 to 45 mol % MgO+CaO, 3 to 30 mol % $Na_2O+Li_2O$, 0 to 15 mol % $Al_2O_3$, and 35 to 60 mol % $SiO_2$.

Crystallized Glass

Crystallized glass whose main crystals consist of enstatite and/or a solid solution thereof, containing 35 to 65 mol % $SiO_2$, 5 to 25 mol % $Al_2O_3$, 10 to 40 mol % MgO, and 5 to 15 mol % $TiO_2$.

Polishing was performed with a two-side polishing apparatus, using a hard polisher and a cerium oxide polishing compound in the first polishing step, a soft polisher and a cerium oxide polishing compound in the first polishing step, and a super-soft polisher and a colloidal silica polishing compound in the first polishing step.

The glass substrates were produced in the examples and comparative examples by suitably adjusting the hardness of the polisher being used, the average particle size of the polishing compound, the washing conditions before chemical reinforcement (washing liquid, treatment temperature, washing liquid concentration), and so forth for the surface roughness Rmax and the maximum height wa of microwaviness.

In the magnetic disk manufacturing step, an in-line sputtering apparatus was used to successively form an Ni—Al seed layer, a CrMo under layer, a CoCrPtTa magnetic layer, and a carbon hydride protective layer, and then a perfluoropoly ether lubricating layer was formed by dipping to produce the magnetic disk.

Figure 1:
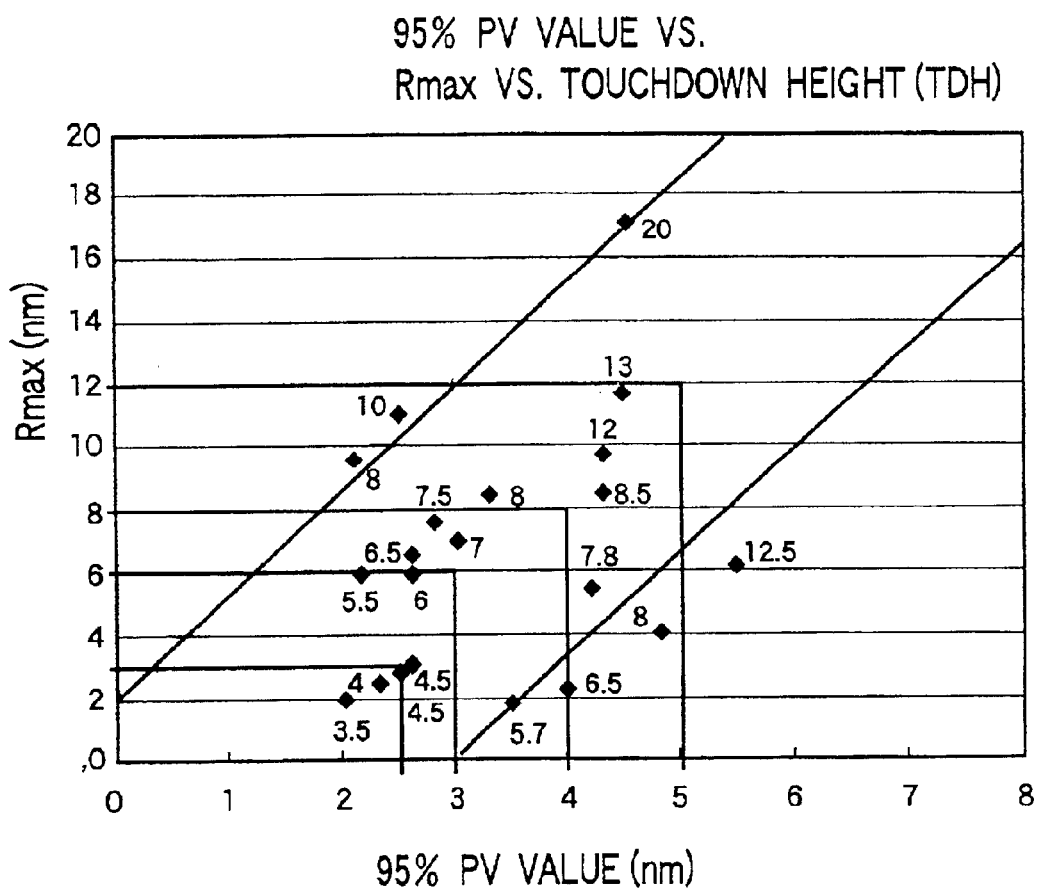
FIG. 1 is a graph showing a relationship between microwaviness, surface roughness and touchdown height of exemplary substrates according to this invention.

The maximum height wa of microwaviness (95% PV value), the surface roughness Rmax, and the touchdown height (TDH) of the magnetic disk glass substrate obtained by the above manufacturing method were measured, the results of which are given in the table and FIG. 1.

The maximum height of microwaviness (95% PV value) was measured with a multifunction surface analyzer (MicroXAM) made by Phase Shift Technology (×10 object lens used; measurement wavelength: 2 to 500 $\mu$m; measurement range: 554.34 $\mu$m×617.87 $\mu$m), while the surface roughness Rmax was measured by atomic force microscope (AFM) (measured at a 5 $\mu$m*5 $\mu$m area).

The maximum height of microwaviness (95% PV value) is an average value measured at 12 points on the main surface of the substrate at 0°, 90°, 180°, and 270° on the ID side(Inner radius of the recording and playback area), the MD side (Middle radius of the recording and playback area), and the OD side(Outer radius of the recording and playback area).

TABLE

| | Type of glass | 95% PV value (nm) | Rmax (nm) | 95% PV value *Rmax (nm*nm) | TDH (nm) |
|---|---|---|---|---|---|
| Example 1 | Chemically reinforced A | 2.03 | 1.87 | 4 | 3.5 |
| Example 2 | Chemically reinforced A | 2.32 | 2.43 | 5.64 | 4.0 |
| Example 3 | Chemically reinforced A | 2.51 | 2.73 | 6.85 | 4.5 |
| Example 4 | Chemically reinforced A | 2.6 | 3 | 8 | 4.5 |
| Example 5 | Crystallized glass | 2.15 | 5.83 | 12.5 | 5.5 |
| Example 6 | Chemically reinforced B | 2.6 | 6.5 | 17 | 6.5 |
| Example 7 | Chemically reinforced A | 4.47 | 11.62 | 51.9 | 13 |
| Example 8 | Chemically reinforced A | 4.3 | 9.68 | 41.6 | 12 |
| Example 9 | Chemically reinforced A | 4.3 | 8.4 | 36 | 8.5 |
| Example 10 | Chemically reinforced A | 2.8 | 7.5 | 21 | 7.5 |
| Example 11 | Chemically reinforced A | 3.3 | 8.4 | 28 | 8 |
| Example 12 | Chemically reinforced A | 3 | 6.92 | 21 | 7 |
| Example 13 | Chemically reinforced A | 2.6 | 5.99 | 15.6 | 6 |
| Example 14 | Chemically reinforced A | 4.2 | 5.38 | 22.6 | 7.8 |
| Example 15 | Chemically reinforced A | 3.5 | 1.8 | 6 | 5.7 |
| Comparative example 1 | Chemically reinforced A | 4.5 | 17 | 76.5 | 20 |
| Comparative example 2 | Chemically reinforced A | 2.5 | 11 | 28 | 10 |
| Comparative example 3 | Chemically reinforced A | 4.8 | 4.02 | 19.3 | 8 |
| Comparative example 4 | Chemically reinforced A | 5.5 | 6.12 | 34 | 12.5 |
| Comparative example 5 | Chemically reinforced A | 3.98 | 2.2 | 8.76 | 6.5 |
| Comparative example 6 | Chemically reinforced A | 2.1 | 9.5 | 20 | 8 |

Figure 2:
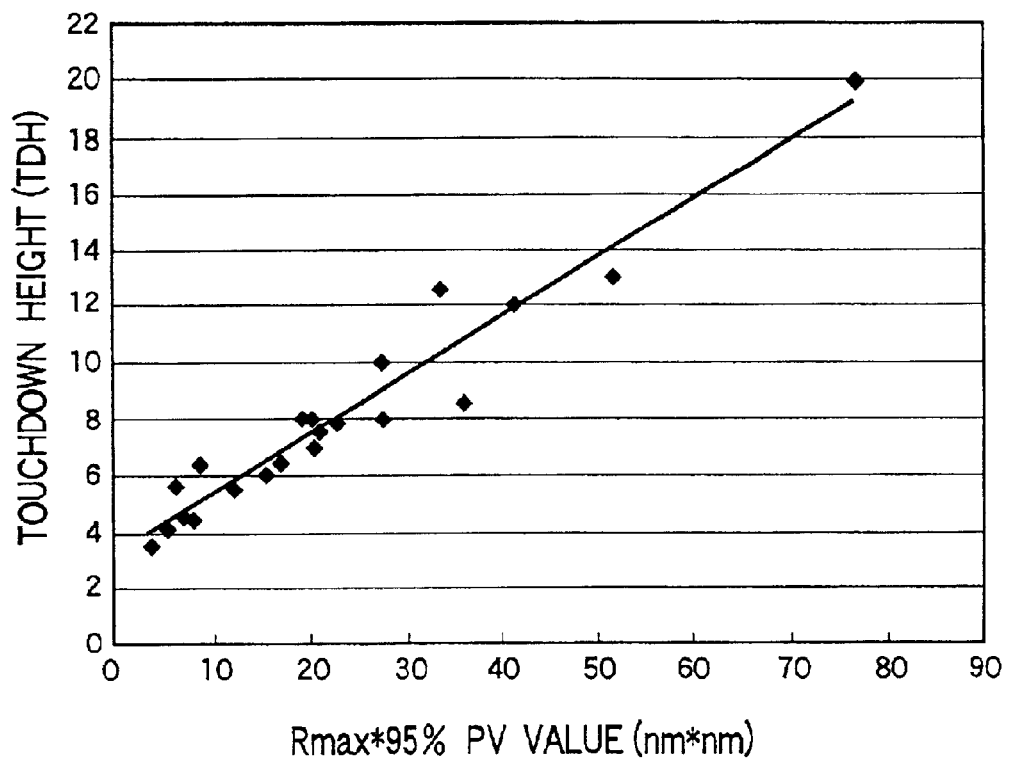
FIG. 2 is a graph showing a relationship between the product of microwaviness and surface roughness, and touchdown height of exemplary substrates according to this invention.

As can be seen from the results in FIGS. 1 and 2, to achive a touchdown height of 15 nm, wa (95% PV value) must be 5 nm or less and Rmax 12 nm or less; to achive a touchdown height of 7 nm, wa (95% PV value) must be 4 nm or less and Rmax 8 nm or less; to achive a touchdown height of 6 nm, wa (95% PV value) must be 3.5 nm or less and Rmax 6 nm or less; and to achive a touchdown height of 4.5 nm, wa (95% PV value) must be 2.5 nm or less and Rmax 4 nm or less;

Along with the above conditions for wa (95% PV value) and Rmax, if we let x be wa (95% PV value) and y be Rmax, a comparison of Examples 1 to 15, in which the conditions $y \geq 10/3x-10$ and $y \leq 10/3x+2$ are satisfied, and Comparative Examples 2 to 6, in which the conditions $y \geq 10/3-10$ and $y \leq 10/3x+2$ are not satisfied, reveals medium noise tends to be worse in Comparative Examples 2 and 6, and moduluation tends to be worse in Comparative Examples 3 to 5. Therefore, to obtain the desired touchdown height and reduction in modulation and medium noise, along with the above conditions for wa (95% PV value) and Rmax, if we let x be wa (95% PV value) and y be Rmax, it can be seen that it is is preferable to satisfy the conditions of $y \geq 10/3x-10$ and $y \leq 10/3x+2$.

It can also be seen in FIG. 2 that there is a correlation to touchdown height when the product of wa (95% PV value) and Rmax is used as a parameter. Therefore, if we determine the correlation between the product of the maximum height wa (units: nm) of the microwaviness and the maximum height Rmax (units: nm) measured by atomic force microscope and the touchdown height T of an information recording medium when at least a magnetic layer is formed on the main surface of the above-mentioned substrate for an information recording medium, and if the Rmax×wa corresponding to the desired touchdown height is determined from the found correlation, and a substrate surface is finished to the determined Rmax×wa with the polishing conditions suitably adjusted, then the desired touchdown height can be easily obtained. More specifically, as shown in FIG. 2, a touchdown height of 15 nm or less can be achieved if wa×Rmax≦58(nm*nm). Furthermore, achieving a touchdown height of 10 nm or less requires that wa×Rmax≦33 (nm*nm), achieving a touchdown height of 8 nm or less requires that wa×Rmax≦24(nm*nm), achieving a touchdown height of 6 nm or less requires that wa×Rmax≦14 (nm*nm), and achieving a touchdown height of 4.5 nm or less requires that wa×Rmax≦7(nm*nm).

A comparison of the crystallized glass in Example 5 with the amorphous glass in Examples 13 and 14, all of which had approximately the same surface roughness, reveals that the microwaviness value tends to be lower with crystallized glass.

What is claimed is:

1. A substrate for a magnetic disc, wherein the period of microwaviness is 2 μm to 4mm, and if we let wa be the maximum height of this microwaviness measured at a measurement area for the microwaviness selected from the recording and playback areas on the substrate and Rmax be the maximum height of surface roughness measured by atomic force microscope at a measurement area for the surface roughness selected from the recording and playback areas on the substrate, when wa is expressed by x and Rmax by y, the following are satisfied:

$x \leq 5$ nm, $y \leq 12$ nm, $y \geq (10/3)x-10$, $y \leq (10/3)x+2$, provided that wa is the difference between the highest and lowest points on a measurement curve of all measured points in a measurement area for the microwaviness.

2. A substrate for a magnetic disc, wherein the period of microwaviness is 2 μm to 4 mm, the product of multiplying the maximum height wa (units: nm) of this microwaviness measured at a measurement area for the microwaviness selected from the recording and playback areas on the substrate by the maximum height Rmax (units: rim) of surface roughness measured by atomic force microscope at a measurement area for the surface roughness selected from the recording and playback areas on the substrate is compared with the result of fanning at least a magnetic layer on the main surface of the substrate for a magnetic disc and conducting a touchdown height test, and a specific Rmax x wa is set so that the desired touchdown height value will be obtained for the correlation between the product of Rmax and wa and the touchdown height, provided that wa is the difference between the highest and lowest points on a measurement curve of all measured points in a measurement area for the microwaviness.

3. A substrate for a magnetic disc, wherein the period of microwaviness is 2 μm to 4 mm, and if we let wa (units: nm) be the maximum height of this microwaviness measured at a measurement area for the microwaviness selected from the recording and playback areas on the substrate and Rmax (units: nm) be the maximum height of surface roughness measured by atomic force microscope at a measurement area for the surface roughness selected from the recording and playback areas on the substrate, the following is satisfied;

$R\text{max} \times wa \leq 58(\text{nm}*\text{nm})$, provided that wa is the difference between the highest and lowest points on a measurement curve of all measured points in a measurement area for the microwaviness.

4. The substrate for the magnetic disc according to claim 1, wherein wa is a value obtained by excluding any abnormal protrusion points from the measured points.

5. A magnetic disc, wherein at least a recording layer being a magnetic layer is formed on the substrate for the magnetic disc according to claim 1.

6. A method for controlling the surface of a substrate for a magnetic disc, wherein the period of microwaviness measured for the main surface of the substrate for the magnetic disc is 2 μm to 4 mm, the correlation is found between the product of the maximum height wa (units: nm) of this microwaviness measured at a measurement area for the microwaviness selected from the recording and playback areas on the substrate and the maximum height Rmax (units: nm) of surface roughness measured by atomic force microscope at a measurement area for the surface roughness selected from the recording and playback areas on the substrate and the touchdown height T of said magnetic disc when at least a magnetic layer is formed on the main surface of the substrate for the magnetic disc, and the Rmax×wa of the substrate for the magnetic disc is determined such that the magnetic disc will have the desired touchdown height for the found correlation, provided that wa is the difference between the highest and lowest points on a measurement curve of all measured points in a measurement area for the microwaviness.

7. The method for controlling the surface of the substrate for the magnetic disc according to claim 6, wherein wa is a value obtained by excluding any abnormal protrusion points from the measured points.

8. The substrate for the magnetic disc according to claim 1, wherein the period of said microwaviness is 2 μm to 650 μm.

9. The substrate for the magnetic disc according to claim 2, wherein the period of said microwaviness is 2 μm to 650 μm.

10. The substrate for the magnetic disc according to claim 3, wherein the period of said microwaviness is 2 µm to 650 µm.

11. The substrate for the magnetic disc according to claim 6, wherein the period of said microwaviness is 2 µm to 650 µm.

12. The magnetic disc according to claim 5, wherein a perfluoropolyether lubricating layer is formed on said recording layer through a protective layer.

13. The substrate for the magnetic disc according to claim 1, wherein the substrate is made of glass.

14. The substrate for the magnetic disc according to claim 2, wherein the substrate is made of glass.

15. The substrate for the magnetic disc according to claim 3, wherein the substrate is made of glass.

16. A method for manufacturing the substrate for the magnetic disc according to claim 13, comprising:

polishing said glass with a cerium oxide polishing compound; and thereafter polishing said glass with a colloidal silica polished compound.

17. A method for manufacturing the substrate for the magnetic disc according to claim 14, comprising:

polishing said glass with a cerium oxide polishing compound; and thereafter polishing said glass with a colloidal silica polished compound.

18. A method for manufacturing the substrate for the magnetic disc according to claim 15, comprising:

polishing said glass with a cerium oxide polishing compound; and thereafter polishing said glass with a colloidal silica polished compound.

19. The substrate for the magnetic disc according to claim 2, wherein wa is a value obtained by excluding any abnormal protrusion points from the measured points.

20. The substrate for the magnetic disc according to claim 3, wherein wa is a value obtained by excluding any abnormal protrusion points from the measured points.

21. A magnetic disc, wherein at least a recording layer being a magnetic layer is formed on the substrate for the magnetic disc to claim 2.

22. A magnetic disc, wherein at least a recording layer being a magnetic layer is formed on the substrate for the magnetic disc according to claim 3.

23. The substrate for the magnetic disc according to claim 13, herein said glass is an aluminosilicate glass.

24. The substrate for the magnetic disc according to claim 14, wherein said glass is an aluminosilicate glass.

25. The substrate for the magnetic disc according to claim 15, wherein said glass is an aluminosilicate glass.

26. The substrate for the magnetic disc according to claim 13, wherein said glass is a crystallized glass.

27. The substrate for the magnetic disc according to claim 14, wherein said glass is a crystallized glass.

28. The substrate for the magnetic disc according to claim 15, wherein said glass is a crystallized glass.

29. The magnetic disc according to claim 21, wherein a perfluoropolyether lubricating layer is formed on said recording layer through a protective layer.

30. The magnetic disc according to claim 22, wherein a perfluoropolyether lubricating layer is formed on said recording layer through a protective layer.

31. A method for manufacturing a magnetic disc, wherein at least a magnetic layer as a recording layer is formed on the substrate for the magnetic disc manufactured by the method of claim 16.

32. A method for manufacturing a magnetic disc, wherein at least a magnetic layer as a recording layer is formed on the substrate for the magnetic disc manufactured by the method of claim 17.

33. A method for manufacturing a magnetic disc, wherein at least a magnetic layer as a recording layer is formed on the substrate for the magnetic disc manufactured by the method of claim 18.

* * * * *

UNITED STATES PATENT AND TRADEMARK OFFICE
CERTIFICATE OF CORRECTION

PATENT NO.    : 6,790,509 B2
DATED         : September 14, 2004
INVENTOR(S)   : Tomotaka Yokoyama et al.

It is certified that error appears in the above-identified patent and that said Letters Patent is hereby corrected as shown below:

Column 12,
Line 3, should read -- substrate by the maximum height Rmax (units: nm) of --

Column 14,
Line 8, should read -- 13, wherein said glass is an aluminosilicate glass. --

Signed and Sealed this

Eighteenth Day of January, 2005

JON W. DUDAS
*Director of the United States Patent and Trademark Office*